(12) United States Patent
Seregin et al.

(10) Patent No.: US 10,805,641 B2
(45) Date of Patent: Oct. 13, 2020

(54) INTRA FILTERING APPLIED TOGETHER WITH TRANSFORM PROCESSING IN VIDEO CODING

(71) Applicant: QUALCOMM Incorporated, San Diego, CA (US)

(72) Inventors: Vadim Seregin, San Diego, CA (US); Xin Zhao, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/987,560

(22) Filed: May 23, 2018

(65) Prior Publication Data
US 2018/0367814 A1    Dec. 20, 2018

Related U.S. Application Data

(60) Provisional application No. 62/520,426, filed on Jun. 15, 2017.

(51) Int. Cl.
*H04B 1/66*    (2006.01)
*H04N 19/70*    (2014.01)
(Continued)

(52) U.S. Cl.
CPC ............. *H04N 19/70* (2014.11); *H04N 19/11* (2014.11); *H04N 19/117* (2014.11);
(Continued)

(58) Field of Classification Search
CPC ...... H04N 19/70; H04N 19/11; H04N 19/117; H04N 19/12; H04N 19/159; H04N 19/174;
(Continued)

(56) References Cited

U.S. PATENT DOCUMENTS 6,088,802 A    7/2000    Bialick et al.
8,356,189 B2    1/2013    Carrico et al.
(Continued)

FOREIGN PATENT DOCUMENTS

EP    2506574 A2    10/2012
EP    2699000 A1    2/2014

OTHER PUBLICATIONS

Alshina E., et al., "Description of Exploration Experiments on Coding Tools," Joint Video Exploration Team (JVET) of ITU-T SG 16 WP 3 and ISO/IEC JTC 1/SC 29/WG 11; 6th Meeting: Hobard, AU, Mar. 31-Apr. 7, 2017, JVET-F1011, Apr. 29, 2017, 10 pages.
(Continued)

*Primary Examiner* — Peet Dhillon
(74) *Attorney, Agent, or Firm* — Campbell C. Chiang; Shumaker & Sieffert P.A.

(57) ABSTRACT

A method of decoding video data includes receiving a block of video data, determining an intra prediction mode for the block of video data, and determining whether or not to use a position-dependent prediction combination (PDPC) mode to decode the block of video data based at least on the determined intra prediction mode. The method may also include receiving a syntax element associated with a primary transform or a secondary transform used for a block of video data, determining a usage of one or more video coding tools based on a value of the syntax element, the one or more video coding tools being video coding techniques other than the primary transform or secondary transform, and applying the one or more coding tools to the block of video data based on the determined usage.

20 Claims, 9 Drawing Sheets

(51) Int. Cl.
H04N 19/11 (2014.01)
H04N 19/12 (2014.01)
H04N 19/117 (2014.01)
H04N 19/159 (2014.01)
H04N 19/174 (2014.01)
H04N 19/176 (2014.01)
H04N 19/593 (2014.01)
H04N 19/119 (2014.01)

(52) U.S. Cl.
CPC ........... H04N 19/12 (2014.11); H04N 19/159 (2014.11); H04N 19/174 (2014.11); H04N 19/176 (2014.11); H04N 19/593 (2014.11); H04N 19/119 (2014.11)

(58) Field of Classification Search
CPC ... H04N 19/176; H04N 19/593; H04N 19/119
See application file for complete search history.

(56) References Cited

U.S. PATENT DOCUMENTS

| | | |
|---|---|---|
| 8,621,601 B2 | 12/2013 | Yan et al. |
| 2009/0257492 A1 | 10/2009 | Andersson et al. |
| 2013/0034158 A1 | 2/2013 | Kirchhoffer et al. |
| 2014/0355669 A1 | 12/2014 | Chien et al. |
| 2016/0063462 A1 | 3/2016 | Whytock |
| 2016/0359836 A1 | 12/2016 | Horgan et al. |
| 2017/0094285 A1 | 3/2017 | Said et al. |
| 2018/0131962 A1 | 5/2018 | Chen et al. |
| 2018/0199062 A1 | 7/2018 | Zhang et al. |
| 2018/0262763 A1 | 9/2018 | Seregin et al. |
| 2018/0367814 A1 | 12/2018 | Seregin et al. |
| 2019/0149822 A1* | 5/2019 | Kim ................ H04N 19/176 |
| 2020/0021818 A1 | 1/2020 | Seregin et al. |

OTHER PUBLICATIONS

An J., et al., "Block partitioning structure for next generation video coding", MPEG doc. m37524 and ITU-T SG16 Doc. COM16-C966-E, Oct. 2015, pp. 1-7.

Bjontegaard G., "Prop.(Pext) Extension for 4:2:2 and 4:4:4 YUV", 8. JVT Meeting; May 23, 2003-May 27, 2003; Geneva, CH; (Joint Video Team of ISO/IEC JTC1/SC29/WG11 and ITU-T SG.16), No. JVT-H032-L, May 27, 2003 (May 27, 2003), pp. 1-7, XP030005736.

Chen J., et al., Algorithm Description of Joint Exploration Test Model 5 (JEM 5) Joint Video Exploration Team (JVET) of ITU-T SG 16 WP 3 and ISO/IEC JTC 1/SC 29/WG 11, 5th Meeting: Geneva, Jan. 12-20, 2017, JVET-E1001-v2, 44 Pages.

Chen J., et al., Algorithm Description of Joint Exploration Test Model4 Joint Video Exploration Team (JVET) of ITU-T SG 16 WP 3 and ISO/IEC JTC 1/SC 29/WG 11, 4th Meeting: Chengdu, Oct. 15-21, 2016, JVET-D1001-v3, 39 pp.

Huang H., "EE2.1: Quadtree plus binary tree structure integration with JEM tools," Joint Video Exploration Team (JVET) of ITU-T SG 16 WP 3 and ISO/IEC JTC 1/SC 29/WG 11, 3rd Meeting: Geneva, CH, May 26-Jun. 1, 2016, JVET-O0024, 5 pp.

International Search Report and Written Opinion—PCT/US2018/034352—ISA/EPO—dated Jul. 18, 2018.

"ITU-T H.265, Series H: Audiovisual and Multimedia Systems, Infrastructure of audiovisual services—Coding of moving video, High efficiency video coding," The International Telecommunication Union, Apr. 2015, 634 pp.

Karczewicz M., et al., "EE1: Alternative Setting for PDPC Mode and Explicit ARSS flag (tests 3-7)," Joint Video Exploration Team (JVET) of ITU-T SG 16 WP 3 and ISO/IEC JTC 1/SC 29/WG 11; 7th Meeting; document No. JVET-G0104, Jul. 13-21, 2017, 6 pages.

Leannec et al., "Asymmetric Coding Units in QTBT," Joint Video Exploration Team (JVET) of ITU-T SG 16 WP 3 and ISO/IEC JTC 1/SC 29/WG 11; 4th Meeting, Chengdu, CN; Oct. 15-21, 2016, No. JVET-D0064, Oct. 10, 2018, 10 pp.

Lin Y., et al., "Modification to DC Prediction in SDIP", 97. MPEG Meeting; Jul. 18, 2011-Jul. 22, 2011; Torino; (Motion Picture Expert Group or ISO/IEC JTC1/SC29/WG11), No. m21018, JCTVC-F584, Jul. 2, 2011 (Jul. 2, 2011), pp. 1-3, XP030049581.

Panusopone K., et al., "Cross-Check of JVET-F0055 : Explicit Flag Signalling for ARSS", 6th JVET Meeting; Mar. 31, 2017-Apr. 7, 2017; Hobart; (The Joint Video Exploration Team of ISO/IEC JTC1/SC29/WG11 and ITU-T SG.16); URL: http://phenix.int-evry.fr/jvet/,,No. JVET-F0081, Apr. 2, 2017, XP030150755, 2 pages.

Panusopone K., et al., "Unequal Weight Planar Prediction and Constrained PDPC", 5th JVET Meeting; Jan. 12, 2017-Jan. 20, 2017; Geneva; (The Joint Video Exploration Team of ISO/IEC JTC1/SC29/WG11 and ITU-T SG.16); URL: http://phenix.int-evry.fr/jvet/,,No. JVET-E0068, Jan. 5, 2017, XP030150550, 6 pages.

Seregin V., et al., "Non-EE1: PDPC without a Mode Flag", 7th JVET Meeting; Jul. 13, 2017-Jul. 21, 2017; Torino; (The Joint Video Exploration Team of ISO/IEC JTC1/SC29/WG11 and ITU-T SG.16); URL: http://phenix.int-evry.fr/jvet/,, No. JVET-G0107-v2, Jul. 8, 2017, XP030150909, 3 pages.

Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.

Filippov A., et al., "Adaptive Reference Sample Smoothing Simplification," 2. JVET Meeting; Feb. 20, 2016-Feb. 26, 2016; San Diego, USA (The Joint Video Exploration Team of ISO/IEC JTC1/SC29/WG11 and ITU-T SG.16); URL: http://phenix.int-evry.fr/jvet/, No. JVET-B0041-v4, Feb. 21, 2016 (Feb. 21, 2016), pp. 1-6, XP030150036.

Huawei Technology LTD. Co., "Reference Sample Adaptive Filtering for Intra Coding," ITU, Telecommunication Standardization Sector, COM 16-C 983-E, Oct. 2015, 4 Pages.

Karczewicz M., et al., "Non-EE1: Alternative setting for PDPC mode," Joint Video Exploration Team (JVET) of ITU-T SG 16 WP 3 and ISO/IEC JTC 1/SC 29/WG 11; 6th Meeting; document No. JVET-F0054r2, Mar. 31-Apr. 7, 2017, 2 pp.

Kim S-H., et al., "Further improvement of intra coding tools," Joint Video Exploration Team (JVET) of ITU-T SG 16 WP 3 and ISO/IEC JTC 1/SC 29/WG 11, 2nd Meeting; San Diego, USA, Feb. 20-26, 2016, document No. JVET-B0051, San Diego, USA, Feb. 20, 2016, pp. 1-5.

Seregin V., et al., "Non-EE1: Explicit flag signalling for ARSS," Joint Video Exploration Team (JVET) of ITU-T SG 16 WP: and ISO/IEG JTC 1/SC 29/WG 11; 6th Meeting; document No. JVET-F0055r2, Mar. 31-Apr. 7, 2017, 2 pp.

Chen J., et al., "Algorithm Description of Joint Exploration Test Model 1," Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.

* cited by examiner

INTRA FILTERING APPLIED TOGETHER WITH TRANSFORM PROCESSING IN VIDEO CODING

This application claims the benefit of U.S. Provisional Application No. 62/520,426, filed Jun. 15, 2017, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC or H.265) standard, and extensions of such standards. The video devices may transmit, receive, encode, decode, and/or store digital video information more efficiently by implementing such video coding techniques.

Video coding techniques include spatial (intra picture) prediction and/or temporal (inter picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Pictures may be referred to as frames, and reference pictures may be referred to as reference frames.

Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized. Entropy coding may be applied to achieve even more compression.

SUMMARY

In general, this disclosure describes techniques related to determining the use of one or more video coding tools. In some examples, a video encoder or decoder may determine the use of a video coding tool based on the intra prediction mode used for a block of video data. In other examples, a video encoder or decoder may determine the use of a video coding tool based on a transform used for the block of video data. Video coding tools may include techniques for filtering intra prediction reference samples (e.g., mode dependent intra smoothing (MDIS)) or a position-dependent prediction combination (PDPC) mode. In this way, a video encoder may be configured to signal a syntax element that indicates a particular transform and the video decoder may be configured to determine both the transform and the usage of the video coding tool from the syntax element for the transform. As such, overhead signaling is reduced and compression efficiency may be increased.

In one example, a method of decoding video data comprises receiving a block of video data, determining an intra prediction mode for the block of video data, and determining whether or not to use a PDPC mode to decode the block of video data based at least on the determined intra prediction mode.

In another example, an apparatus configured to decode video data comprises a memory configured to store a block of video data, and one or more processors in communication with the memory, the one or more processors configured to receive the block of video data, determine an intra prediction mode for the block of video data, and determine whether or not to use a PDPC mode to decode the block of video data based at least on the determined intra prediction mode.

In another example, an apparatus configured to decode video data comprises means for receiving a block of video data, means for determining an intra prediction mode for the block of video data, and means for determining whether or not to use a PDPC mode to decode the block of video data based at least on the determined intra prediction mode.

In another example, this disclosure describes a non-transitory computer-readable storage medium storing instructions that, when executed, causes one or more processors of a device configured to decode video data to receive the block of video data, determine an intra prediction mode for the block of video data, and determine whether or not to use a PDPC mode to decode the block of video data based at least on the determined intra prediction mode.

In another example, a method of encoding video data comprises receiving a block of video data, determining an intra prediction mode for encoding the block of video data, and determining whether or not to use a PDPC mode to encode the block of video data based at least on the determined intra prediction mode.

In another example, an apparatus configured to encode video data comprises a memory configured to store a block of video data, and one or more processors in communication with the memory, the one or more processors configured to receive the block of video data, determine an intra prediction mode for encoding the block of video data, and determine whether or not to use a PDPC mode to encode the block of video data based at least on the determined intra prediction mode.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

This disclosure describes techniques for coding a block of video data using intra prediction. In some examples, this disclosure describes techniques for the determination of prediction directions, intra filtering, transform processing, and video coding tools (e.g., specific video coding techniques for video encoding and decoding).

Figure 1:
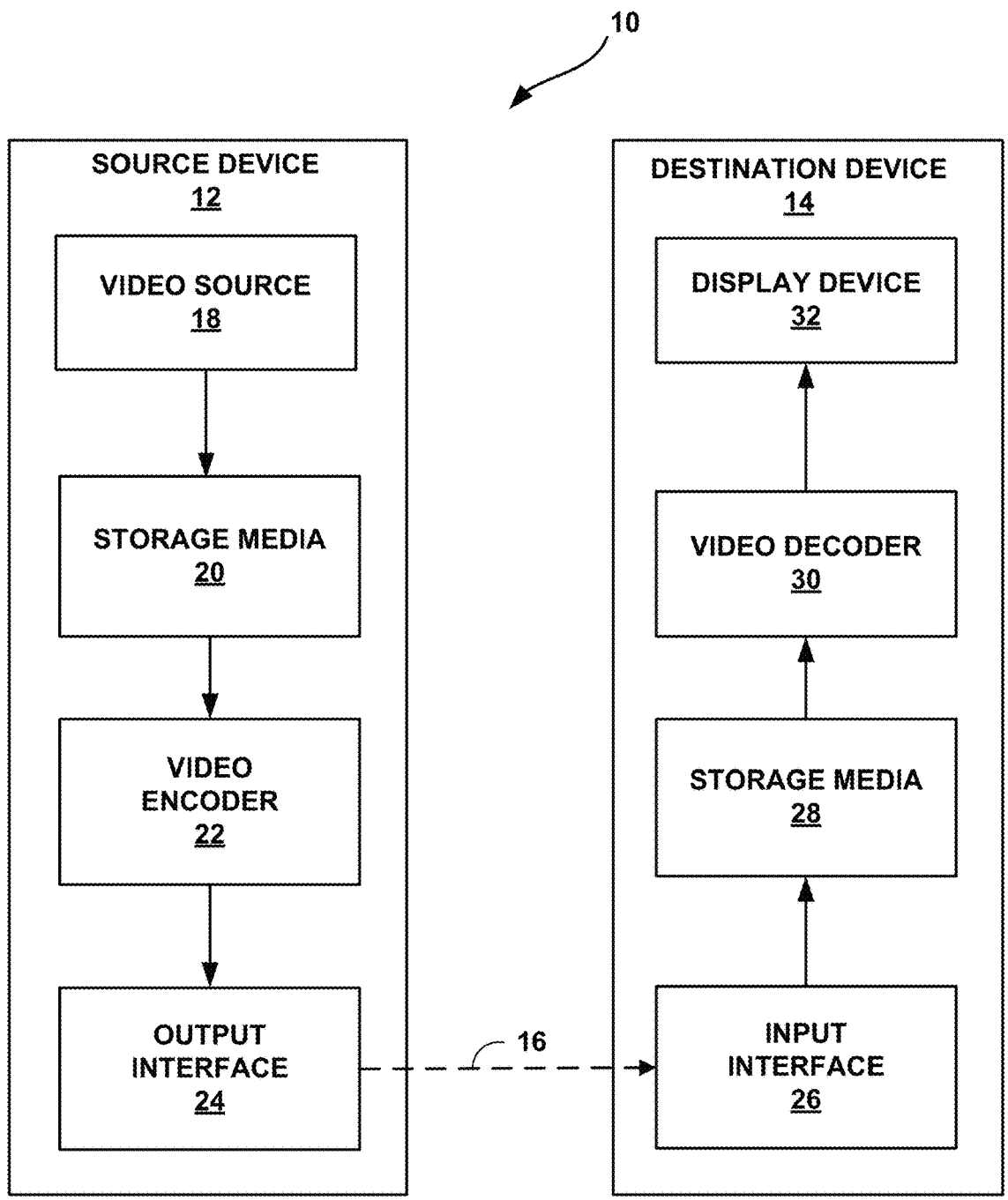
FIG. 1 is a block diagram illustrating an example video encoding and decoding system configured to implement techniques of the disclosure.

FIG. 1 is a block diagram illustrating an example video encoding and decoding system 10 that may be configured to perform the techniques of this disclosure for intra prediction filtering and transform processing. As shown in FIG. 1, system 10 includes source device 12 that provides encoded video data to be decoded at a later time by destination device 14. In particular, source device 12 provides the video data to destination device 14 via computer-readable medium 16. Source device 12 and destination device 14 may comprise any of a wide range of devices, including desktop computers, notebook (e.g., laptop) computers, tablet computers, set-top boxes, telephone handsets such as so-called "smart" phones (or more generally, mobile stations), tablet computers, televisions, cameras, display devices, digital media players, video gaming consoles, video streaming device, or the like. A mobile station may be any device capable of communicating over a wireless network. In some cases, source device 12 and destination device 14 may be equipped for wireless communication. Thus, source device 12 and destination device 14 may be wireless communication devices (e.g., mobile stations). Source device 12 is an example video encoding device (i.e., a device for encoding video data). Destination device 14 is an example video decoding device (i.e., a device for decoding video data).

In the example of FIG. 1, source device 12 includes video source 18, storage media 20 configured to store video data, video encoder 22, and output interface 24. Destination device 14 includes input interface 26, storage media 28 configured to store encoded video data, video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device 32.

The illustrated system 10 of FIG. 1 is merely one example. Techniques for processing and/or coding (e.g., encoding and/or decoding) video data may be performed by any digital video encoding and/or decoding device. Although the techniques of this disclosure are generally performed by a video encoding device and/or video decoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 20) configured to store the video data. The techniques described in this disclosure may be applicable to video coding in general, and may be applied to wireless and/or wired applications. In each case, the captured, pre-captured, or computer-generated video may be encoded by video encoder 22. Output interface 24 may output the encoded video information (e.g., a bitstream of encoded video data) to computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques described in this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 22 that is also used by video decoder 30, that includes syntax elements that describe characteristics and/or processing of blocks and other coded units, e.g., groups of pictures (GOPs). Storage media 28 may store encoded video data received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 22 and video decoder 30 each may be implemented as any of a variety of suitable video encoder and/or video decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 22 and video decoder 30 may be included in one or more encoders or decoders, either of which may be integrated as part of a combined CODEC in a respective device.

In some examples, video encoder 22 and video decoder 30 may operate according to a video coding standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has been developed by the Joint Collaboration Team on Video Coding (JCT-VC) of ITU-T Video Coding Experts Group (VCEG) and ISO/IEC Motion Picture Experts Group (MPEG). Video coding standards also include proprietary video codecs, such Google VP8, VP9, VP10, and video codecs developed by other organizations, for example, the Alliance for Open Media.

In some examples, video encoder 22 and video decoder 30 may be configured to operate according to other video coding techniques and/or standards, including new video coding techniques being explored by the Joint Video Exploration Team (JVET). The JVET performs testing according to a software model called the Joint Exploratory Model (JEM).

As will be explained in more detail below, in one example of the disclosure, video decoder 30 may be configured to receive a block of video data, determine an intra prediction mode for the block of video data, and determine whether or not to use a PDPC mode to decode the block of video data based at least on the determined intra prediction mode. Likewise, video encoder 22 may be configured to receive a block of video data, determine an intra prediction mode for encoding the block of video data, and determine whether or not to use a PDPC mode to encode the block of video data based at least on the determined intra prediction mode.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (e.g., a block) of luma samples. So is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture (e.g., an encoded video bitstream), video encoder 22 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 22 may recursively perform quadtree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 22 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 22 may generate predictive blocks (e.g., luma, Cb, and Cr predictive blocks) for prediction blocks (e.g., luma, Cb, and Cr prediction blocks) of each PU of the CU.

Video encoder 22 may use intra prediction or inter prediction to generate the predictive blocks for a PU. If video encoder 22 uses intra prediction to generate the predictive blocks of a PU, video encoder 22 may generate the predictive blocks of the PU based on decoded samples of the picture that includes the PU.

After video encoder 22 generates predictive blocks (e.g., luma, Cb, and Cr predictive blocks) for one or more PUs of a CU, video encoder 22 may generate one or more residual blocks for the CU. As one example, video encoder 22 may generate a luma residual block for the CU. Each sample in the CU's luma residual block indicates a difference between a luma sample in one of the CU's predictive luma blocks and a corresponding sample in the CU's original luma coding block. In addition, video encoder 22 may generate a Cb residual block for the CU. In one example of chroma prediction, each sample in the Cb residual block of a CU may indicate a difference between a Cb sample in one of the CU's predictive Cb blocks and a corresponding sample in the CU's original Cb coding block. Video encoder 22 may also generate a Cr residual block for the CU. Each sample in the CU's Cr residual block may indicate a difference between a Cr sample in one of the CU's predictive Cr blocks and a corresponding sample in the CU's original Cr coding block. However, it should be understood that other techniques for chroma prediction may be used.

Furthermore, video encoder 22 may use quadtree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 22 may apply one or more transforms a transform block of a TU to generate a coefficient block for the TU. For instance, video encoder 22 may apply one or more transforms to a luma transform block of a TU to generate a luma coefficient block for the TU. A coefficient block may be a two-dimensional array of transform coefficients. A transform coefficient may be a scalar quantity. Video encoder 22 may apply one or more transforms to a Cb transform block of a TU to generate a Cb coefficient block for the TU. Video encoder 22 may apply one or more transforms to a Cr transform block of a TU to generate a Cr coefficient block for the TU.

After generating a coefficient block (e.g., a luma coefficient block, a Cb coefficient block or a Cr coefficient block), video encoder 22 may quantize the coefficient block. Quantization generally refers to a process in which transform coefficients are quantized to possibly reduce the amount of data used to represent the transform coefficients, providing further compression. After video encoder 22 quantizes a coefficient block, video encoder 22 may entropy encode syntax elements indicating the quantized transform coefficients. For example, video encoder 22 may perform context-adaptive binary arithmetic coding (CABAC) on the syntax elements indicating the quantized transform coefficients.

Video encoder 22 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive an encoded video bitstream generated by video encoder 22. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 22. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

A quadtree plus binary tree (QTBT) partition structure is currently being studied by the Joint Video Exploration Team (JVET). In J. An et al., "Block partitioning structure for next generation video coding", International Telecommunication Union, COM16-C966, September 2015 (hereinafter, "VCEG proposal COM16-C966"), QTBT partitioning techniques were described for future video coding standard beyond HEVC. Simulations have shown that the proposed QTBT structure may be more efficient than the quadtree structure used in HEVC.

In the QTBT structure described in VCEG proposal COM16-C966, a CTB is first partitioned using quadtree partitioning techniques, where the quadtree splitting of one node can be iterated until the node reaches the minimum allowed quadtree leaf node size. The minimum allowed quadtree leaf node size may be indicated to video decoder 30 by the value of the syntax element MinQTSize. If the quadtree leaf node size is not larger than the maximum allowed binary tree root node size (e.g., as denoted by a syntax element MaxBTSize), the quadtree leaf node can be further partitioned using binary tree partitioning. The binary tree partitioning of one node can be iterated until the node reaches the minimum allowed binary tree leaf node size (e.g., as denoted by a syntax element MinBTSize) or the maximum allowed binary tree depth (e.g., as denoted by a syntax element MaxBTDepth). VCEG proposal COM16-C966 uses the term "CU" to refer to binary-tree leaf nodes. In VCEG proposal COM16-C966, CUs are used for prediction (e.g., intra prediction, inter prediction, etc.) and transform without any further partitioning. In general, according to QTBT techniques, there are two splitting types for binary tree splitting: symmetric horizontal splitting and symmetric vertical splitting. In each case, a block is split by dividing the block down the middle, either horizontally or vertically. This differs from quadtree partitioning, which divides a block into four blocks.

In one example of the QTBT partitioning structure, the CTU size is set as 128×128 (e.g., a 128×128 luma block and two corresponding 64×64 chroma blocks), the MinQTSize is set as 16×16, the MaxBTSize is set as 64×64, the MinBT-Size (for both width and height) is set as 4, and the MaxBTDepth is set as 4. Quadtree partitioning is applied to the CTU first to generate quadtree leaf nodes. The quadtree leaf nodes may have a size from 16×16 (i.e., the MinQTSize is 16×16) to 128×128 (i.e., the CTU size). According to one example of QTBT partitioning, if the leaf quadtree node is 128×128, the leaf quadtree node cannot be further split by the binary tree, since the size of the leaf quadtree node exceeds the MaxBTSize (i.e., 64×64). Otherwise, the leaf quadtree node is further partitioned by the binary tree. Therefore, the quadtree leaf node is also the root node for the binary tree and has the binary tree depth as 0. The binary tree depth reaching MaxBTDepth (e.g., 4) implies that there is no further splitting. The binary tree node having a width equal to the MinBTSize (e.g., 4) implies that there is no further horizontal splitting. Similarly, the binary tree node having a height equal to MinBTSize implies no further vertical splitting. The leaf nodes of the binary tree (CUs) are further processed (e.g., by performing a prediction process and a transform process) without any further partitioning.

Figures 2A, 2B:
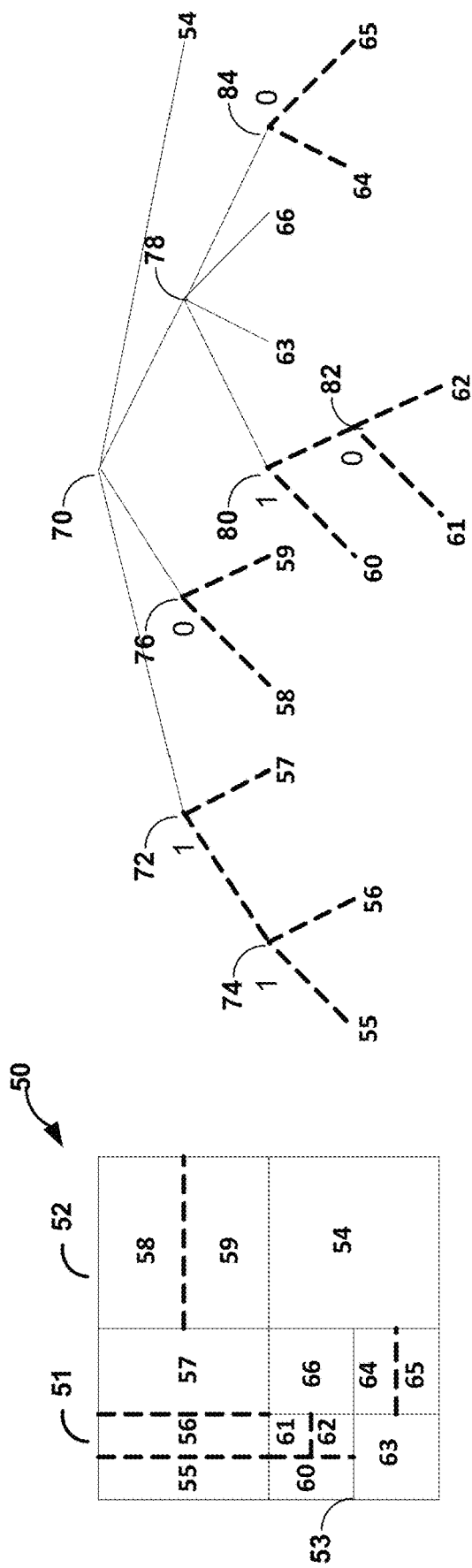
FIG. 2A is a conceptual diagram illustrating an example of block partitioning using a quadtree plus binary tree (QTBT) structure.
FIG. 2B is a conceptual diagram illustrating an example tree structure corresponding to the block partitioning using the QTBT structure of FIG. 2A.

FIG. 2A illustrates an example of a block 50 (e.g., a CTB) partitioned using QTBT partitioning techniques. As shown in FIG. 2A, using QTBT partition techniques, each of the resultant blocks is split symmetrically through the center of each block. FIG. 2B illustrates the tree structure corresponding to the block partitioning of FIG. 2A. The solid lines in FIG. 2B indicate quadtree splitting and dotted lines indicate binary tree splitting. In one example, in each splitting (i.e., non-leaf) node of the binary tree, a syntax element (e.g., a flag) is signaled to indicate the type of splitting performed (e.g., horizontal or vertical), where 0 indicates horizontal splitting and 1 indicates vertical splitting. For the quadtree splitting, there is no need to indicate the splitting type, as quadtree splitting always splits a block horizontally and vertically into 4 sub-blocks with an equal size.

As shown in FIG. 2B, at node 70, block 50 is split into the four blocks 51, 52, 53, and 54, shown in FIG. 2A, using quadtree partitioning. Block 54 is not further split, and is therefore a leaf node. At node 72, block 51 is further split into two blocks using binary tree partitioning. As shown in FIG. 2B, node 72 is marked with a 1, indicating vertical splitting. As such, the splitting at node 72 results in block 57 and the block including both blocks 55 and 56. Blocks 55 and 56 are created by a further vertical splitting at node 74. At node 76, block 52 is further split into two blocks 58 and 59 using binary tree partitioning. As shown in FIG. 2B, node 76 is marked with a 1, indicating horizontal splitting.

At node 78, block 53 is split into 4 equal size blocks using quadtree partitioning. Blocks 63 and 66 are created from this quadtree partitioning and are not further split. At node 80, the upper left block is first split using vertical binary tree splitting resulting in block 60 and a right vertical block. The right vertical block is then split using horizontal binary tree splitting into blocks 61 and 62. The lower right block created from the quadtree splitting at node 78, is split at node 84 using horizontal binary tree splitting into blocks 64 and 65.

In one example of QTBT partitioning, luma and chroma partitioning may be performed independently of each other for I-slices, contrary, for example, to HEVC, where the quadtree partitioning is performed jointly for luma and chroma blocks. That is, in some examples, luma blocks and chroma blocks may be partitioned separately such that luma blocks and chroma blocks do not directly overlap. As such, in some examples of QTBT partitioning, chroma blocks may be partitioned in a manner such that at least one partitioned chroma block is not spatially aligned with a single partitioned luma block. That is, the luma samples that are co-located with a particular chroma block may be within two or more different luma partitions.

In HEVC and JEM, the intra reference (e.g., reference pixels/neighbor samples used for intra prediction) can be smoothed. In some examples, video encoder 22 and video decoder 30 may be configured to apply a filter to the intra reference samples. In HEVC, mode dependent intra smoothing (MDIS) is used such that video encoder 22 and video decoder 30 are configured to apply a filter to an intra reference (e.g., neighbor samples) before generating intra prediction from the neighbor samples for particular intra prediction modes.

Figure 3:
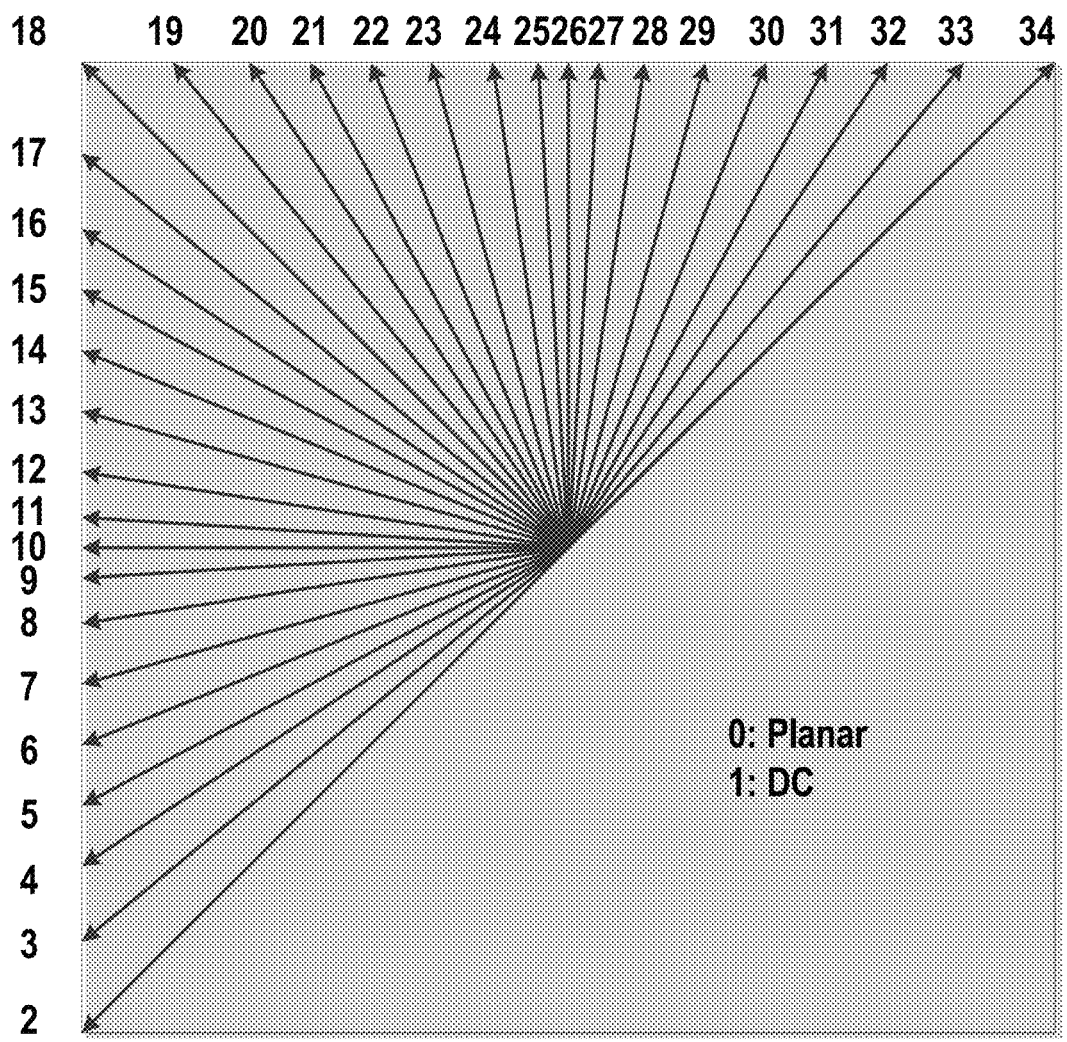
FIG. 3 is an example of 35 intra prediction modes defined in HEVC.

FIG. 3 is a conceptual diagram showing an example of 35 intra prediction modes defined in HEVC. In HEVC, a luma block may be predicted using one of 35 intra prediction, including the planar mode, the DC mode and 33 angular modes. The 35 modes of the intra prediction defined in HEVC are indexed as shown in Table 1 below:

TABLE 1

Specification of intra prediction mode and associated names

| Intra prediction mode | Associated name |
| --- | --- |
| 0 | INTRA_PLANAR |
| 1 | INTRA_DC |
| 2 . . . 34 | INTRA_ANGULAR2 . . . INTRA_ANGULAR34 |

Video encoder 22 and video decoder 30 may be configured to derive the intra prediction modes for which MDIS is enabled based on how close or far the current intra prediction mode is to a horizontal or vertical direction (e.g., a horizontal or vertical intra prediction direction). In one example, video encoder 22 and video decoder 30 may be configured to derive how close or far a particular intra mode is to the horizontal or vertical direction based on the absolute difference between the intra mode index for the current intra prediction mode and the intra prediction mode index of the horizontal and/or the vertical mode intra prediction mode. If this absolute difference exceeds a certain threshold (e.g., the threshold may be block size dependent), video encoder 22 and video decoder 30 may be configured to apply the MDIS filter to the reference samples. If this absolute difference is less than or equal to a certain threshold (e.g., the threshold may be block size dependent), video encoder 22 and video decoder 30 may be configured to not apply the MDIS filter to the reference samples. Examples thresholds may include 10 (e.g., for 4×4 blocks), 7 (e.g., for 8×8 blocks), 1 (e.g., for 16×16 blocks), and zero (e.g., for 32×32 blocks). In other words, for intra prediction modes that are far from the horizontal or vertical directions, video encoder 22 and video decoder 30 may not apply the intra reference filter. In some examples, video encoder 22 and video decoder 30 may not apply an MDIS filter for non-angular intra prediction modes, such as DC mode or planar mode.

In JEM, MDIS was replaced with a smoothing filter (e.g., reference sample adaptive filtering (RSAF) or adaptive reference sample smoothing (ARSS)), which can be applied for all intra modes. The application of such a smoothing filter to intra reference samples may be referred to as intra smoothing. In some examples, the smoothing filter is not applied for the DC mode. Video encoder 22 may be configured to generate and signal a flag to indicate whether the smoothing filter is applied or not in the current block. Video decoder 30 may be configured to receive and parse such a flag to determine whether or not to apply the smoothing filter for the current block.

In some examples, video encoder 22 may be configured to not signal such a flag as an explicit flag, but rather, video encoder 22 may be configured to hide the indication of the whether not the smoothing filter is applied in a characteristic of the transform coefficients (e.g., the parity of the transform coefficients). Likewise, video decoder 30 may be configured to determine whether or not the smoothing filter is applied (e.g., determine the value of the flag) from the characteristic of the transform coefficients (e.g., the parity of the transform coefficients). For example, if the transform coefficients satisfy a certain parity condition (e.g., odd or even), the value of the flag is derived as 1, otherwise the value of the flag is derived as 0.

Another tool used in JEM is position dependent intra prediction combination (PDPC) mode. PDPC mode is a tool that weights intra predictor and intra reference samples, where video encoder 22 and video decoder 30 derive the weights based on block size of the block being coded (including width and height) and the intra prediction mode.

The techniques described in this disclosure may be used in any combination and in any conjunction with other methods. Intra smoothing and PDPC mode are used for illustration and description purpose, the techniques of this disclosure are not limited to those examples and the disclosed methods can be applied to other tools.

The following sections describes techniques for determining parameters for a position-dependent intra prediction combination (PDPC) coding mode. The intra smoothing techniques of this disclosure may be used in conjunction with PDPC mode. However, intra smoothing and PDPC mode are used for illustration and description purpose, the techniques of this disclosure are not limited to those examples and the disclosed methods can be applied to other tools.

When coding video data using the PDPC coding mode, video encoder 22 and/or video decoder 30 may use one or more parameterized equations that define how to combine predictions based on filtered and unfiltered reference values and based on the position of the predicted pixel. The present disclosure describes several sets of parameters, such that video encoder 22 may be configured to test the sets of parameters (via, e.g., using rate-distortion analysis) and signal to video decoder 30 the optimal parameters (e.g., the parameters resulting in the best rate-distortion performance among those parameters that are tested). In some examples, video decoder 30 may be configured to determine PDPC parameters from characteristics of the video data (e.g., block size, block height, block width, etc.).

Figure 4B:
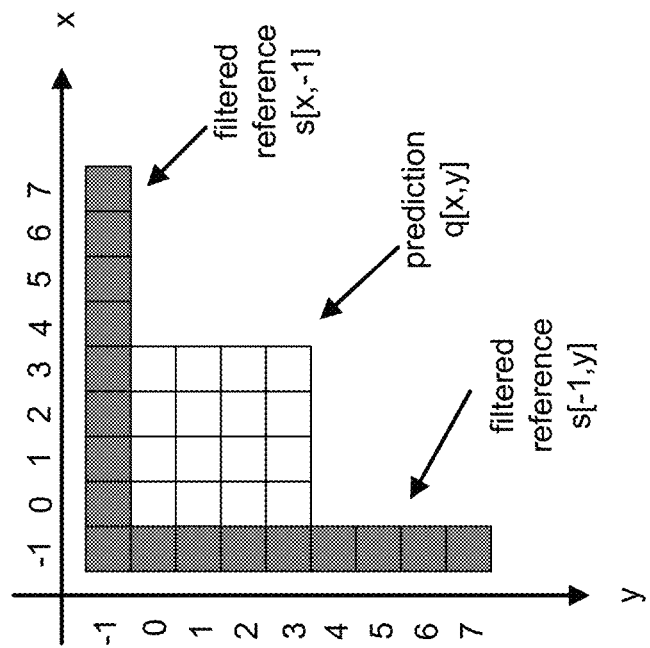
FIG. 4B illustrates a prediction of a 4×4 block using a filtered reference according to techniques of this disclosure.
Figure 4A:
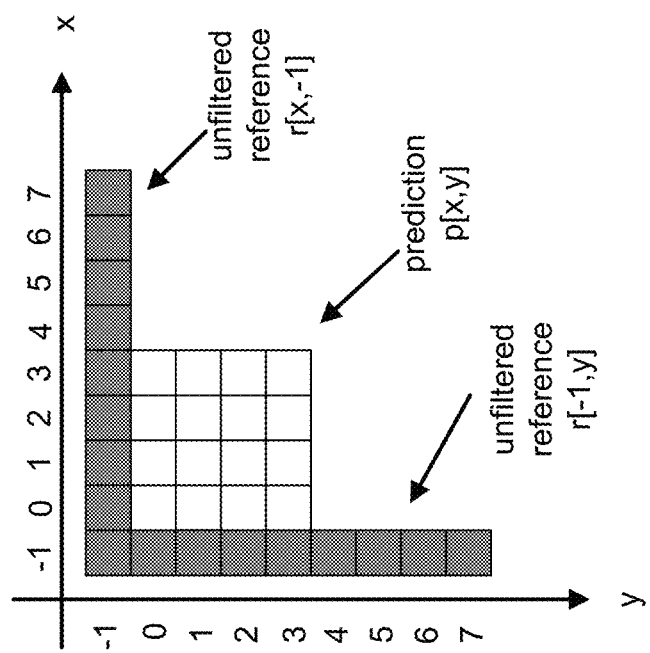
FIG. 4A illustrates a prediction of a 4×4 block using an unfiltered reference according to techniques of this disclosure.

FIG. 4A illustrates a prediction of a 4×4 block (p) using an unfiltered reference (r) according to techniques of the present disclosure. FIG. 4B illustrates a prediction of a 4×4 block (q) using a filtered reference (s) according to techniques of the present disclosure. While both FIGS. 4A and 4B illustrate a 4×4 pixel block and 17 (4×4+1) respective reference values, the techniques of the present disclosure may be applied to any block size and number of reference values.

Video encoder 22 and/or video decoder 30, when performing the PDPC coding mode, may utilize a combination between the filtered (q) and unfiltered (p) predictions, such that a predicted block for a current block to be coded can be computed using pixel values from both the filtered (s) and unfiltered (r) reference arrays.

In one example of the techniques of PDPC, given any two set of pixel predictions $p_r[x,y]$ and $q_s[x,y]$, computed using only the unfiltered and filtered references r and s, respectively, the combined predicted value of a pixel, denoted by $v[x,y]$, is defined by $$v[x,y]=c[x,y]p_r[x,y]+(1-c[x,y])q_s[x,y] \quad (1)$$

where $c[x,y]$ is the set of combination parameters. The value of the weight $c[x,y]$ may be a value between 0 and 1. The sum of the weights $c[x,y]$ and $(1-c[x,y])$ may be equal to one.

In certain examples it may not be practical to have a set of parameters as large as the number of pixels in the block. In such examples $c[x,y]$ may be defined by a much smaller set of parameters, plus an equation to compute all combination values from those parameters. In such an example the following formula may be used:

$$v[x,y] = \left\lfloor \frac{c_1^{(v)}r[x,-1] - c_2^{(v)}r[-1,-1]}{2^{\lfloor y/d_v \rfloor}} \right\rfloor + \left\lfloor \frac{c_1^{(h)}r[-1,y] - c_2^{(h)}r[-1,-1]}{2^{\lfloor x/d_h \rfloor}} \right\rfloor + \left( \frac{N-\min(x,y)}{N} \right) g p_r^{(HEVC)}[x,y] + b[x,y]q_s^{(HEVC)}[x,y] \quad (2)$$

where $c_1^v, c_2^v, c_1^h, c_2^h, g$, and $d_v, d_h \in \{1,2\}$, are prediction parameters, N is the block size, $p_r^{(HEVC)}[x,y]$ and $q_s^{(HEVC)}[x,y]$ are prediction values computed using the according to the HEVC standard, for the specific mode, using respectively the nonfiltered and filtered references, and $$b[x, y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor - \left( \frac{N - \min(x, y)}{N} \right) g \quad (3)$$

is a normalization factor (i.e., to make the overall weights assigned to $p_r^{(HEVC)}[x,y]$ and $q_s^{(HEVC)}[x,y]$ add to 1), defined by the prediction parameters.

Formula 2 may be generalized for any video coding standard in formula 2A:

$$v[x, y] = \qquad (2A)$$
$$\left\lfloor \frac{c_1^{(v)} r[x, -1] - c_2^{(v)} r[-1, -1]}{2^{\lfloor \frac{y}{d_v} \rfloor}} \right\rfloor + \left\lfloor \frac{c_1^{(h)} r[-1, y] - c_2^{(h)} r[-1, -1]}{2^{\lfloor \frac{x}{d_h} \rfloor}} \right\rfloor +$$
$$\left( \frac{N - \min(x, y)}{N} \right) g p_r^{(STD)}[x, y] + b[x, y] q_s^{(STD)}[x, y]$$

where $c_1^v$, $c_2^v$, $c_1^h$, $c_2^h$, g, and $d_v$, $d_h \in \{1,2\}$, are prediction parameters, N is the block size, $p_r^{(STD)}[x,y]$ and $q_s^{(STD)}[x,y]$ are prediction values computed using the according to a video coding standard (or video coding scheme or algorithm), for the specific mode, using respectively the nonfiltered and filtered references, and $$b[x, y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor - \left( \frac{N - \min(x, y)}{N} \right) g \quad (3A)$$

is a normalization factor (i.e., to make the overall weights assigned to $p_r^{(STD)}[x,y]$ and $q_s^{(STD)}[x,y]$ add to 1), defined by the prediction parameters.

These prediction parameters may include weights to provide an optimal linear combination of the predicted terms according to the type of prediction mode used (e.g., DC, planar, and 33 directional modes of HEVC). For example, HEVC contains 35 prediction modes. A lookup table may be constructed with values for each of the prediction parameters $c_1^v$, $c_2^v$, $c_1^h$, $c_2^h$, g, $d_v$, and $d_h$ for each of the prediction modes (i.e., 35 values of $c_1^v$, $c_2^v$, $c_1^h$, $c_2^h$, g, $d_v$, and $d_h$ for each prediction mode). Such values may be encoded in a bitstream with the video or may be constant values known by the encoder and decoder ahead of time and may not need to be transmitted in a file or bitstream. The values for $c_1^v$, $c_2^v$, $c_1^h$, $c_2^h$, g, $d_v$, and $d_h$ may be determined by an optimization training algorithm by finding the values for the prediction parameters that give best compression for a set of training videos.

In another example, there are a plurality of predefined prediction parameter sets for each prediction mode (in e.g. a lookup table) and the prediction parameter set selected (but not the parameters themselves) is transmitted to a decoder in an encoded file or bitstream. In another example, the values for $c_1^v$, $c_2^v$, $c_1^h$, $c_2^h$, g, $d_v$, and $d_h$ may be generated on the fly by video encoder 22 and transmitted to video decoder 30 in an encoded file or bitstream.

In another example, instead of using HEVC prediction, a video coding device performing these techniques may use a modified version of HEVC, like one that uses 65 directional predictions instead of 33 directional predictions. In fact, any type of intra-frame prediction can be used.

In another example, the formula can be chosen to facilitate computations. For example, we can use the following type of predictor $$v[x, y] = \left\lfloor \frac{c_1^{(v)} r[x, -1] - c_2^{(v)} r[-1, -1]}{2^{\lfloor \frac{y}{d_v} \rfloor}} \right\rfloor + \quad (4)$$
$$\left\lfloor \frac{c_1^{(h)} r[-1, y] - c_2^{(h)} r[-1, -1]}{2^{\lfloor \frac{x}{d_h} \rfloor}} \right\rfloor + b[x, y] p_{a,r,s}^{(HEVC)}[x, y]$$

where $$b[x, y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor \quad (5)$$

and $$p_{a,r,s}^{(HEVC)}[x, y] = a p_r^{(HEVC)}[x, y] + (1 - a) q_s^{(HEVC)}[x, y]. \quad (6)$$

Such an approach may exploit the linearity of the HEVC (or other) prediction. Defining h as the impulse response of a filter k from a predefined set, if we have $$s = ar + (1-a)(h*r) \quad (7)$$

where "*" represents convolution, then $$p_{a,r,s}^{(HEVC)}[x,y] = p_s^{(HEVC)}[x,y] \quad (8)$$

i.e., the linearly combined prediction may be computed from the linearly combined reference.

Formulas 4, 6 and 8 may be may be generalized for any video coding standard in formula 4A, 6A, and 8A:

$$v[x, y] = \left\lfloor \frac{c_1^{(v)} r[x, -1] - c_2^{(v)} r[-1, -1]}{2^{\lfloor \frac{y}{d_v} \rfloor}} \right\rfloor + \quad (4A)$$
$$\left\lfloor \frac{c_1^{(h)} r[-1, y] - c_2^{(h)} r[-1, -1]}{2^{\lfloor \frac{x}{d_h} \rfloor}} \right\rfloor + b[x, y] p_{a,r,s}^{(STD)}[x, y]$$

where $$b[x, y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor \quad (5A)$$

and $$p_{a,r,s}^{(STD)}[x, y] = a p_r^{(STD)}[x, y] + (1 - a) q_s^{(STD)}[x, y]. \quad (6A)$$

Such an approach may exploit the linearity of the prediction of the coding standard. Defining h as the impulse response of a filter k from a predefined set, if we have $$s = ar + (1-a)(h*r) \quad (7A)$$

where "*" represents convolution, then $$p_{a,r,s}^{(STD)}[x,y] = p_s^{(STD)}[x,y] \quad (8A)$$

i.e., the linearly combined prediction may be computed from the linearly combined reference.

In an example, prediction functions may use the reference vector (e.g., r and s) only as input. In this example, the behavior of the reference vector does not change if the reference has been filtered or not filtered. If r and s are equal (e.g., some unfiltered reference r happens to be the same as another filtered reference s) then predictive functions, e.g. $p_r[x,y]$ (also written as p(x,y,r)) is equal to $p_s[x,y]$ (also written as p(x,y,s))), applied to filtered and unfiltered references are equal. Additionally, pixel predictions p and q may be equivalent (e.g., produce the same output given the same input). In such an example, formulas (1)-(8) may be rewritten with pixel prediction p[x,y] replacing pixel prediction q[x,y].

In another example, the prediction (e.g., the sets of functions) may change depending on the information that a reference has been filtered. In this example, different sets of functions can be denoted (e.g., $p_r[x,y]$ and $q_s[x,y]$). In this case, even if r and s are equal, $p_r[x,y]$ and $q_s[x,y]$ may not be equal. In other words, the same input can create different output depending on whether the input has been filtered or not. In such an example, p[x,y] may not be able to be replaced by q[x,y].

An advantage of the prediction equations shown is that, with the parameterized formulation, sets of optimal parameters can be determined (i.e., those that optimize the prediction accuracy), for different types of video textures, using techniques such as training. This approach, in turn, may be extended in some examples by computing several sets of predictor parameters, for some typical types of textures, and having a compression scheme where the encoder tests predictors from each set, and encodes as side information the one that yields best compression.

As discussed above, in some examples, video encoder 22 may be configured to signal a flag or index to indicate the usage of a particular video coding tool (e.g., whether or not an intra smoothing filter and/or PDPC mode is applied) for one or more blocks of video data. For example, video encoder 22 may be configured to generate and signal a flag with a value of 0 to indicate a particular coding tool (e.g., an intra smoothing filter and/or PDPC mode) is not applied for the block, while the flag with a value of 1 may indicate that the coding tool (e.g., an intra smoothing filter and/or PDPC mode) is applied for the block. Video decoder 30 may be configured to receive and parse such a flag to determine whether or not to use the particular video coding tool for the one or more blocks of video data associated with the flag.

In some examples, signaling a flag for a particular video coding tool may take a considerably large number of bits such that the compression efficiency gained from using the video coding tool may be significantly reduced. This disclosure describes techniques that couple video coding tool overhead signaling (e.g., syntax elements that indicate video coding tool usage and/or video coding tool parameters) together with signaling for other video coding processes, including signaling for transform processing.

For example, video encoder 22 may be configured to generate and signal syntax elements for transform processing, including primary or secondary transform flags or indices. A primary transform flag or index (e.g., a multi-bit syntax element) may indicate a particular transform, from among multiple to transforms, to use as the primary transform when coding a block of video data. Likewise, a secondary transform flag or index (e.g., a multi-bit syntax element) may indicate a particular transform, from among multiple to transforms, to use as the secondary transform when coding a block of video data. As one example, a primary transform may be discrete cosine transform (DCT) or discrete sine transform (DST) based transforms, enhanced multiple transform (EMT) used in JEM, or any other separable or non-separable transform. Example secondary transforms may include rotational transforms (ROT) or non-separable secondary transforms (NSST), both of which are currently employed in JEM. However, the secondary transform may include any other separable or non-separable transform. The primary and/or second transforms may include several sets of the transforms, which may be indicated by an index. The transform set to use for any particular block of video data, for example, may depend on the intra prediction mode and/or intra prediction mode direction. That is, video encoder 22 and video decoder 30 may be configured to determine the set of transforms available for a particular block of video data based on the intra prediction mode and/or intra prediction mode direction used to code that block of video data.

In one example of the disclosure, video encoder 22 and/or video decoder 30 may be configured to follow certain pre-defined rules that indicate that, when a certain transform flag or index value(s) is signaled, one or more coding tools (e.g., an intra reference sample smoothing filter and/or PDPC mode) is applied for the block, otherwise, when a certain transform flag or index value(s) is not signalled, the coding tool is not applied. In this case, any explicit flag for indicating the usage of the video coding tool need not be signaled. Instead, the determination of whether a particular coding tool is used may be derived from the transform signaling. The examples above include intra reference sample smoothing filters and PDPC mode, though other video coding tool usage may be coupled with transform signaling.

In one example, the video coding tool indicated by transform signaling can be an intra reference sample smoothing filter, such as MDIS, ARSS, or any other smoothing and/or filtering applied to intra reference samples. In another example, the video coding tool indicated by transform signaling can be filtering applied to intra prediction, for example PDPC mode, multi-parameter intra prediction (MPI) mode, or any other filtering applied for the derived intra prediction.

Several tools can be used in a combination, for example, PDPC, MDIS and ARSS or just PDPC and MDIS. In one example, video encoder 22 and video decoder 30 may be configured to apply a particular video coding tool for a block of video data coded with a certain secondary transform (e.g., as indicated by secondary transform index or indices). For example, video decoder 30 may be configured to determine whether to use a particular coding tool (e.g., MDIS, ARSS, etc.) based on the value of an index indicating a certain type of secondary transform. In this way, the use of a secondary transform and at least one other coding tool may be indicated with a single syntax element.

In one example, video decoder 30 may determine to use PDPC mode only when certain secondary transforms are applied, as indicated by secondary transform (NSST) indices. Likewise, video encoder 22 may determine to use PDPC mode only when certain secondary transforms are applied. For example, video encoder 22 and video decoder 30 may be configured to use PDPC mode when a particular secondary transform is used (e.g., when the value NSST index equal to 1). In another example, video encoder 22 and video decoder 30 may be configured to use PDPC mode for certain intra prediction modes irrespective of the secondary transform used (e.g., as indicated by the value of a secondary transform index). For example, video encoder 22 and video decoder 30 may be configured to apply PDPC mode in cases where the intra prediction mode is a planar mode, and/or DC mode, or any other modes.

In another example, video encoder 22 and video decoder 30 may be configured to apply a MDIS video coding tool (or other intra reference sample smoothing filters) only for certain secondary transforms (e.g., as indicated by the value of a secondary transform (NSST) index). As one example, video encoder 22 and video decoder 30 may be configured to apply a MDIS video coding tool (or other intra reference sample smoothing filters) only for an NSST index equal to 3.

In some examples, if the use of more than one video coding tool is dependent on a transform that is used for the block (e.g., the video coding tool is mapped to a transform index), the mapping of the video coding tool to the transform may be mutually exclusive. That is, in one example, each video coding tool corresponds to a different transform index.

The above examples can be combined. For example, video encoder 22 and video decoder 30 may be configured to apply the PDPC mode for an NSST index of 1, and video encoder 22 and video decoder 30 may be configured to apply MDIS or another intra reference smoothing filter for an NSST index of 3. In addition, the use of video encoder 22 and video decoder 30 may be configured to always apply PDPC mode for a block of video data coded using the planar intra prediction mode irrespective of the NSST index for the block.

In yet another example, video encoder 22 and video decoder 30 may be configured to apply the ARSS video coding tool when the NSST index is equal to 2.

If the utilization of different coding tools (e.g., PDPC, NSST, EMT, ARSS, MDIS, MPI, ROT) have multiple options, instead of signaling separate indices for each of the coding tool, video encoder 22 may be configured to only signal one unified index. In this example, the value of the unified index specifies how different coding tools are coupled. In one example, if PDPC mode is designed with three different sets of parameters, and a NSST is designed with three different sets of NSST cores, instead of signaling PDPC indices and NSST indices separately, video encoder 22 may signal only one unified index, but this unified index value specifies the utilization of both PDPC mode and the NSST. For example, when this unified index equals to 0, neither PDPC or NSST is applied. When this unified index equals to 1, PDPC mode parameter set 1 and NSST core 1 is used. When this unified index equals to 2, PDPC mode parameter set 2 and NSST core 2 is used. When this unified index equals to 3, PDPC mode parameter set 3 and NSST core 3 is used. That is, different PDPC modes are bundled with different NSST indices. In another example, for different NSST indices, a MDIS filter with different filter coefficients can be applied.

The coupling between one tool (e.g., PDPC, ARSS, and/or MDIS) and transform (e.g., EMT, NSST) may depend on already coded information, including but not limited to intra prediction mode, block width and height, block partitioning depth, transform coefficient. For example, for different intra prediction modes, PDPC mode may be coupled with different NSST indices. For example, for intra prediction mode 0, PDPC mode is coupled with NSST index 1, and for intra prediction mode 1, PDPC is coupled with NSST index 2.

Figure 5:
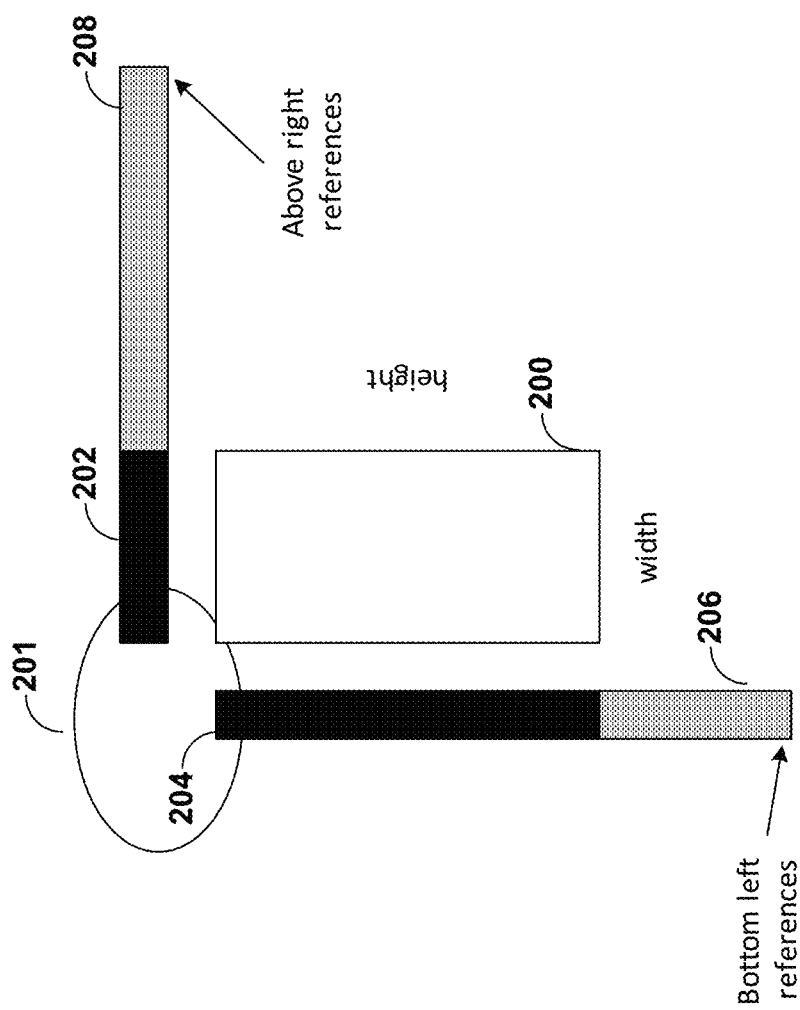
FIG. 5 illustrates an example of intra reference filtering.

The next section relates to strong intra reference filtering. In U.S. Provisional Application No. 62/445,207, filed Jan. 11, 2017, and U.S. patent application Ser. No. 15/866,287, filed Jan. 9, 2018, division free strong intra smoothing method was described. In some examples, if non-of-power-2 division is used, video encoder 22 and video decoder 30 may be configured to split the process into several parts, where video encoder 22 and video decoder 30 may be configured to perform only a power-of-2 division for each part of the process. Such a technique may be implemented as a simple bit shift operation. In this disclosure, a more detailed example is described. Consider a rectangular block, where in JEM, the division of non-power-of-2 is used due to the division by (width+height) of the block. FIG. 5 shows an example where, for a non-square block 200, the filtering process is divided into several parts.

As shown in FIG. 5, the filtering process is performed on left intra reference samples 202 and above intra reference samples 204 (indicated by the black boxes), as well as bottom left intra reference samples 206 and above right intra reference samples 208 (indicated by dotted boxes). The division used is non-power-of 2. Video encoder 22 and video decoder 30 may be configured to split the filtering process into parts for the horizontal and vertical direction, such that one part corresponds to the width and/or height of block 200, and the other part is whatever length is left. In this particular example, the leftover part is the width length for vertical filtering and the height length for the horizontal filtering (i.e., bottom left intra reference samples 206 and above right intra reference samples 208 in the dotted box). As can be seen, each part can run the filtering process with power-of-2 division, since with and height may be required to be size that is a power of 2.

In addition, depending on the filtering process, some samples may be copied. For example, if the filtering formula is $(length-i)*a+i*b$, where i is from 1 to length $-1$. Length is the size of the sample array to be filtered. The length can be, for example, width+height. The values a and b can be end samples of the sample array to be filtered.

It can be seen that one sample is not filtered for i=0, and this sample can be directly copied. When, the filtering process is split into several parts, the number of directly copied samples may increase. This may result in additional samples to be not filtered in each direction, and such samples may be directly copied. Direct copy may mean that filtering process is not applied for that sample.

Which sample may be directly copied may be variable. In one example of the disclosure, video encoder 22 and video decoder 30 may be configured to put the directly copied sample(s) at the end of the intra reference samples of each direction, i.e. in the bottom left samples for vertical filtering and above right samples for horizontal filtering. In this way, those samples may be less often used in intra prediction. The accuracy of such samples is less sensitive to the efficiency of the intra prediction, since such samples are the farthest from the block.

In another example, direct copied samples can be placed in each part of the filtering process. In the above example, it can be one sample in each black and dotted areas of filtering. That is, video encoder 22 and video decoder 30 may place one direct copied sample in each of left reference samples 204, bottom left reference samples 206, above reference samples 202, and above right reference samples 208. In one example, the direct copied samples can be placed at the end of each part. For example, video encoder 22 and video decoder 30 may position a direct copied sample at the bottom of left reference samples 204. Likewise, video encoder 22 and video decoder 30 may position a direct copied sample at the bottom of bottom left reference samples 206. In addition, video encoder 22 and video decoder 30 may position a direct copied sample at the right end of above reference samples 202. Video encoder 22 and video decoder 30 may also position a direct copied sample at the right end of above right reference samples 208. The advantage of such design is uniformity of the filtering process, since there is no need to group direct copied samples in a certain area.

In another example, the direct copied samples, can be placed in the top left area 201 (e.g., the beginning of the block boxes of samples 204 and 202). In a more general example, the direct copied samples can be placed in any location within the intra reference samples.

In another example, video encoder 22 and video decoder 30 may implement a strong smoothing as a fixed N-tap linear filter instead of the two-tap bilinear filter, such that the division operation using a divisor which is not a power of 2 can be avoided. In one example, a 5-tap or a 7-tap Gaussian filter is used to replace the two-tap bilinear strong smoothing filter, where the parameter of Gaussian filter may be pre-defined or depending on already coded information including but not limited to the block size, block shape, intra prediction mode.

In one example of the disclosure, video encoder 22 and video decoder 30 may be configured to code a non-square block using intra prediction, and apply strong intra reference filtering to intra reference samples in two parts, a first part associated with intra reference samples along one of the height or width of the block, and a second part associated with the remaining intra reference samples.

Video encoder 22 and video decoder 30 may be further configured to directly copy at least one reference sample from the first part. In another example, video encoder 22 and video decoder 30 may be further configured to directly copy at least one reference sample from the second part. In another example, video encoder 22 and video decoder 30 may be further configured to directly copy at least one reference sample from both the first part and the second part.

Figure 6:
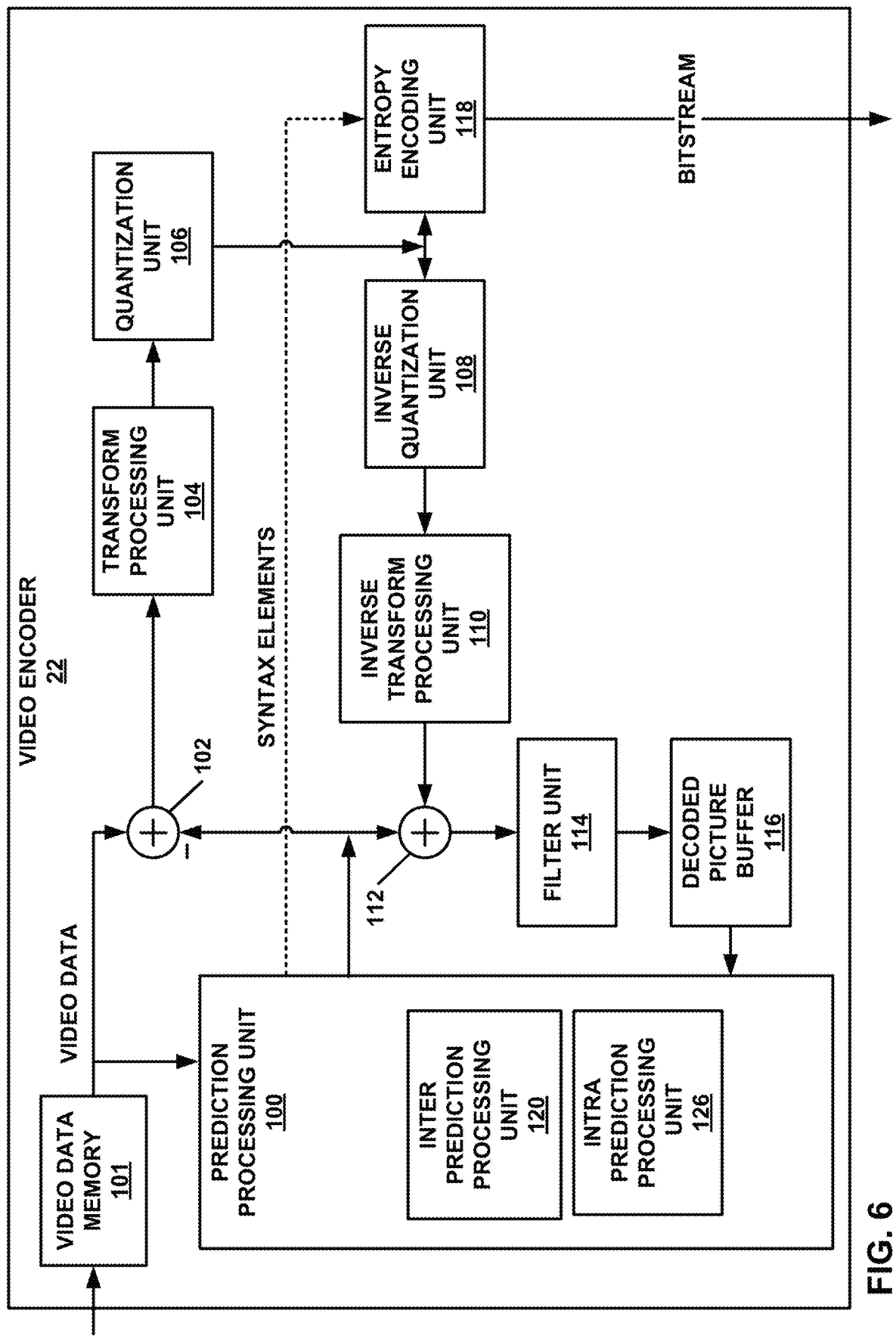
FIG. 6 is a block diagram illustrating an example of a video encoder configured to implement techniques of the disclosure.

FIG. 6 is a block diagram illustrating an example video encoder 22 that may implement the techniques of this disclosure. FIG. 6 is provided for purposes of explanation and should not be considered limiting of the techniques as broadly exemplified and described in this disclosure. The techniques of this disclosure may be applicable to various coding standards or methods. Video encoder 22 may be configured to perform the combined coding tool and transform signaling techniques described above. In addition, video encoder 22 may be configured to perform strong intra reference filtering as described above.

In the example of FIG. 6, video encoder 22 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter prediction processing unit 120 and an intra prediction processing unit 126. Inter prediction processing unit 120 may include a motion estimation unit and a motion compensation unit (not shown).

Video data memory 101 may be configured to store video data to be encoded by the components of video encoder 22. The video data stored in video data memory 101 may be obtained, for example, from video source 18. Decoded picture buffer 116 may be a reference picture memory that stores reference video data for use in encoding video data by video encoder 22, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 22, or off-chip relative to those components. Video data memory 101 may be the same as or part of storage media 20 of FIG. 1.

Video encoder 22 receives video data. Video encoder 22 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. In some examples, video encoder 22 may partition blocks using a QTBT structure. The smaller blocks may be coding blocks of CUs. For example, prediction processing unit 100 may partition a CTB associated with a CTU according to a tree structure. In accordance with one or more techniques of this disclosure, for each respective non-leaf node of the tree structure at each depth level of the tree structure, there are a plurality of allowed splitting patterns for the respective non-leaf node and the video block corresponding to the respective non-leaf node is partitioned into video blocks corresponding to the child nodes of the respective non-leaf node according to one of the plurality of allowable splitting patterns.

Video encoder 22 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 22 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 22 and video decoder 30 may support PU sizes of 2N×2N or N×N for intra prediction, and symmetric PU sizes of 2N×2N, 2N×N, N×2N, N×N, or similar for inter prediction. Video encoder 22 and video decoder 30 may also support asymmetric partitioning for PU sizes of 2N×nU, 2N×nD, nL×2N, and nR×2N for inter prediction.

Inter prediction processing unit 120 may generate predictive data for a PU by performing inter prediction on each PU of a CU. The predictive data for the PU may include predictive blocks of the PU and motion information for the PU. Inter prediction processing unit 120 may perform different operations for a PU of a CU depending on whether the PU is in an I slice, a P slice, or a B slice. In an I slice, all PUs are intra predicted. Hence, if the PU is in an I slice, inter prediction processing unit 120 does not perform inter prediction on the PU. Thus, for blocks encoded in I-mode, the predicted block is formed using spatial prediction from previously-encoded neighboring blocks within the same frame. If a PU is in a P slice, inter prediction processing unit 120 may use uni-directional inter prediction to generate a predictive block of the PU. If a PU is in a B slice, inter prediction processing unit 120 may use uni-directional or bi-directional inter prediction to generate a predictive block of the PU.

Intra prediction processing unit 126 may generate predictive data for a PU by performing intra prediction on the PU. The predictive data for the PU may include predictive blocks of the PU and various syntax elements. Intra prediction processing unit 126 may perform intra prediction on PUs in I slices, P slices, and B slices.

To perform intra prediction on a PU, intra prediction processing unit 126 may use multiple intra prediction modes to generate multiple sets of predictive data for the PU. Intra prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter prediction processing unit 120 for the PUs or the predictive data generated by intra prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quadtree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quadtree structure known as a "residual quadtree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 22 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 22 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter prediction processing unit 120 may use a reference picture that contains the reconstructed coding blocks to perform inter prediction on PUs of other pictures. In addition, intra prediction processing unit 126 may use reconstructed coding blocks in decoded picture buffer 116 to perform intra prediction on other PUs in the same picture as the CU.

Entropy encoding unit 118 may receive data from other functional components of video encoder 22. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 22 may output a bitstream that includes entropy-encoded data generated by entropy encoding unit 118. For instance, the bitstream may include data that represents an RQT for a CU.

Figure 7:
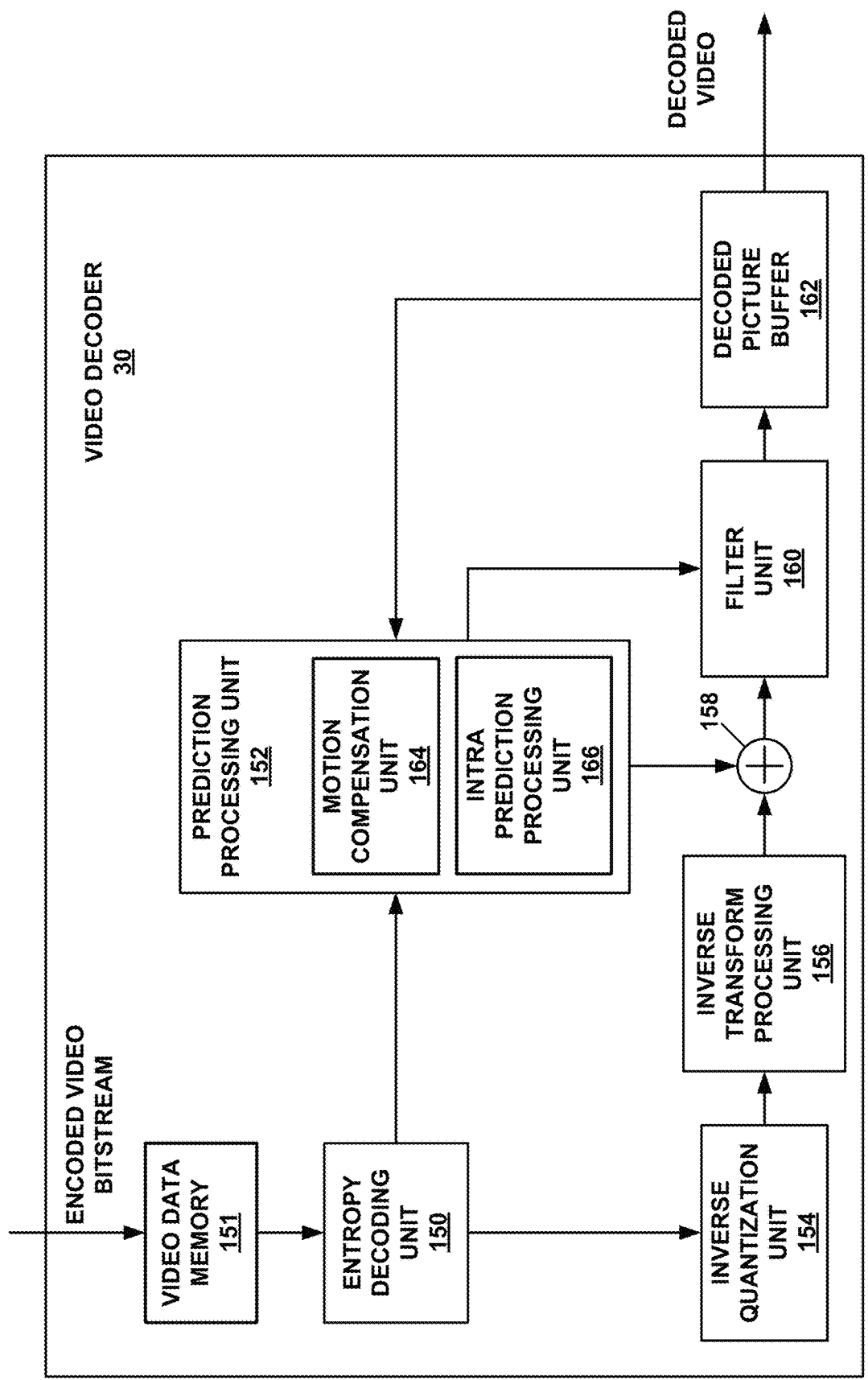
FIG. 7 is a block diagram illustrating an example of a video decoder configured to implement techniques of the disclosure.

FIG. 7 is a block diagram illustrating an example video decoder 30 that is configured to implement the techniques of this disclosure. FIG. 7 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods, including JVET. Video decoder 30 may be configured to receive and parse syntax elements signalled in accordance with the combined coding tool and transform signaling techniques described above. In addition, video decoder 30 may be configured to perform strong intra reference filtering as described above.

In the example of FIG. 7, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In accordance with some examples of this disclosure, entropy decoding unit 150 may determine a tree structure as part of obtaining the syntax elements from the bitstream. The tree structure may specify how an initial video block, such as a CTB, is partitioned into smaller video blocks, such as coding units. In accordance with one or more techniques of this disclosure, for each respective non-leaf node of the tree structure at each depth level of the tree structure, there are a plurality of allowed splitting patterns for the respective non-leaf node and the video block corresponding to the respective non-leaf node is partitioned into video blocks corresponding to the child nodes of the respective non-leaf node according to one of the plurality of allowable splitting patterns.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra prediction processing unit 166 may perform intra prediction to generate predictive blocks of the PU. Intra prediction processing unit 166 may use an intra prediction mode to generate the predictive blocks of the PU based on samples spatially-neighboring blocks. Intra prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra prediction data or inter prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Figure 8:
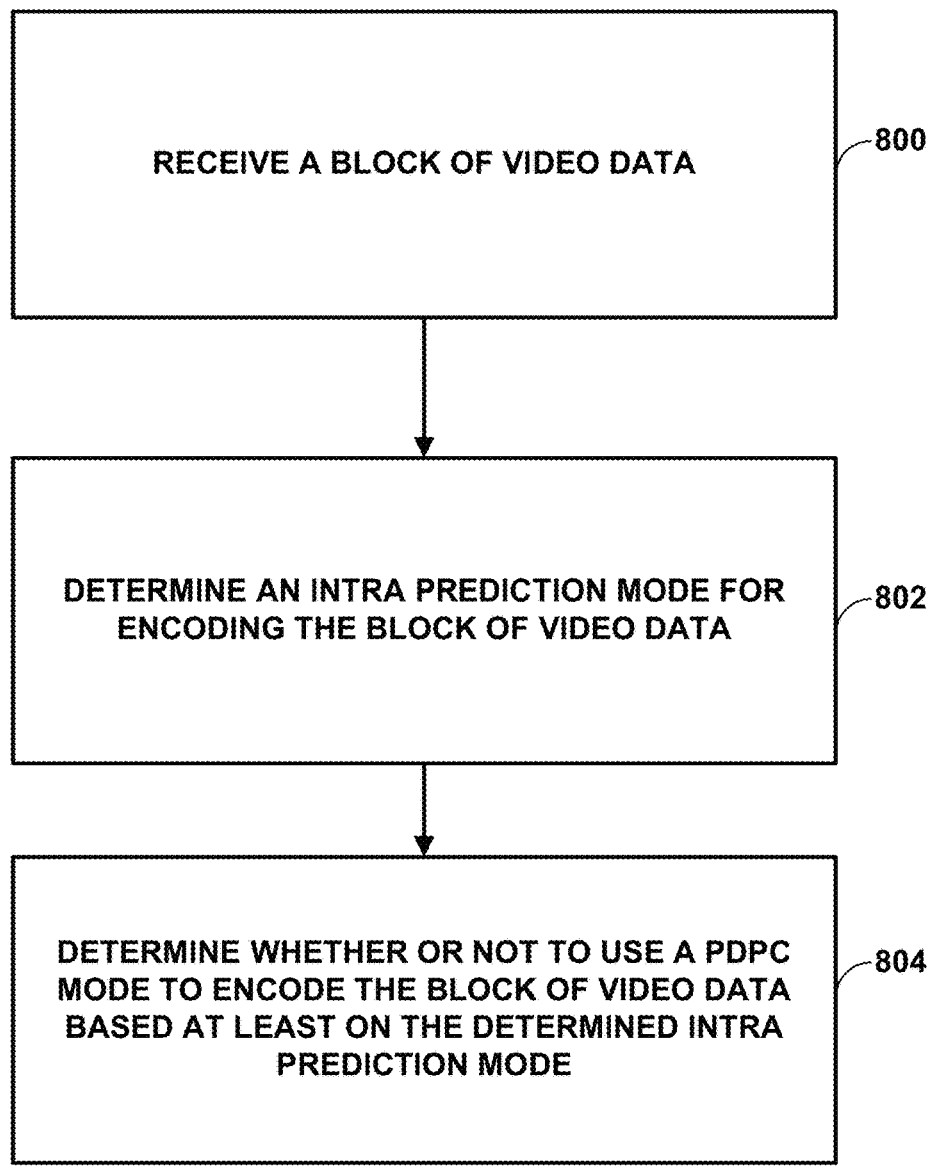
FIG. 8 is a flowchart illustrating an example encoding method of the disclosure.

FIG. 8 is a flowchart illustrating an example encoding method of the disclosure. One or more structural components of video encoder 22 may be configured to perform the techniques of FIG. 8.

In the example of FIG. 8, video encoder 22 may be configured to receive a block of video data (800), determine an intra prediction mode for encoding the block of video data (802), and determine whether or not to use a PDPC mode to encode the block of video data based at least on the determined intra prediction mode (804). In one example, to determine whether or not to use the PDPC, video encoder 22 may be further configured to determine to use the PDPC mode to encode the block of video data in the case that the intra prediction mode is a planar mode.

Figure 9:
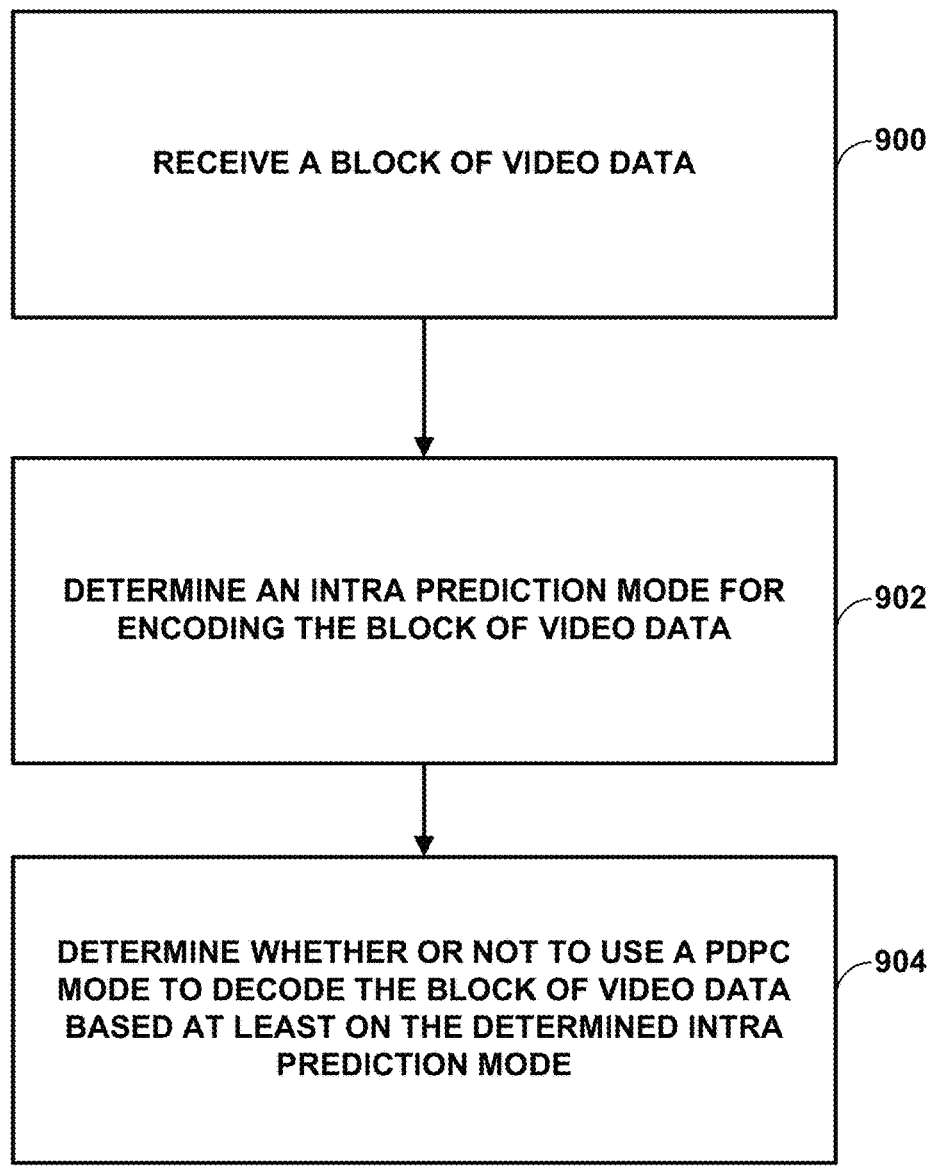
FIG. 9 is a flowchart illustrating an example decoding method of the disclosure.

FIG. 9 is a flowchart illustrating an example decoding method of the disclosure. One or more structural components of video decoder 30 may be configured to perform the techniques of FIG. 9. In the example of FIG. 9, video decoder 30 may be configured to a block of video data (900), determine an intra prediction mode for the block of video data (902), and determine whether or not to use a PDPC mode to decode the block of video data based at least on the determined intra prediction mode (904).

In one example, video decoder 30 may be configured to determine to use the PDPC mode to decode the block of video data in the case that the intra prediction mode is a planar mode.

In another example, video decoder 30 may be configured to receive a syntax element associated with a primary transform or a secondary transform used for the block of video data, determine a usage of one or more video coding tools based on a value of the syntax element, the one or more video coding tools being video coding techniques other than the primary transform or secondary transform, and apply the one or more coding tools to the block of video data based on the determined usage.

In another example, video decoder 30 may be configured to determine whether or not to use the PDPC to decode the block of video data based on the determined intra prediction mode and the value of the syntax element associated with the primary transform or the secondary transform used for the block of video data.

In another example, video decoder 30 may be configured to determine to use the PDPC mode to decode the block of video data in the case that the intra prediction mode is a planar mode irrespective of the value of the syntax element associated with the primary transform or the secondary transform used for the block of video data. In one example, the primary transform is one of a DCT, DST, or EMT. In another example, the secondary transform is one of a rotational transform or a NSST. In another example, the one or more video coding tools include one or more of the PDPC mode, MDIS, RSAF, ARSS, or MPI.

In another example, video decoder 30 may be configured to decode the block of video data using the determined intra prediction mode and the PDPC mode in the case that it is determined to use the PDPC mode, or decode the block of video data using the determined intra prediction mode and not the PDPC mode in the case that it is not determined to use the PDPC mode. Video decoder 30 may be further configured to output the decoded block of video data.

Certain aspects of this disclosure have been described with respect to extensions of the HEVC standard and the JEM for purposes of illustration. However, the techniques described in this disclosure may be useful for other video coding processes, including other standard or proprietary video coding processes under development or not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
 receiving a block of video data;
 receiving a syntax element associated with a primary transform or a secondary transform used for the block of video data;
 determining an intra prediction mode for the block of video data; and
 determining whether or not to use a position-dependent prediction combination (PDPC) mode to decode the block of video data based at least on the determined intra prediction mode and a value of the syntax element associated with the primary transform or the secondary transform used for the block of video data, wherein determining whether or not to use the PDPC mode comprises:
determining to use the PDPC mode to decode the block of video data in the case that the intra prediction mode is a planar mode irrespective of a value of the syntax element associated with the primary transform or the secondary transform used for the block of video data.

2. The method of claim 1, wherein determining whether or not to use the PDPC comprises:
determining to use the PDPC mode to decode the block of video data in the case that the intra prediction mode is a planar mode.

3. The method of claim 1, wherein the primary transform is one of a discrete cosine transform (DCT), discrete sine transform (DST), or enhanced multiple transform (EMT).

4. The method of claim 1, wherein the secondary transform is one of a rotational transform or a non-separable secondary transform (NSST).

5. The method of claim 1, wherein the syntax element is an index to the primary transform or the secondary transform.

6. The method of claim 1, wherein the syntax element is an index to a set of transforms.

7. The method of claim 1, further comprising:
decoding the block of video data using the determined intra prediction mode and the PDPC mode in the case that it is determined to use the PDPC mode; or
decoding the block of video data using the determined intra prediction mode and not the PDPC mode in the case that it is not determined to use the PDPC mode.

8. The method of claim 7, further comprising:
outputting the decoded block of video data.

9. An apparatus configured to decode video data, the apparatus comprising:
a memory configured to store a block of video data; and
one or more processors in communication with the memory, the one or more processors configured to:
receive the block of video data;
receive a syntax element associated with a primary transform or a secondary transform used for the block of video data;
determine an intra prediction mode for the block of video data; and
determine whether or not to use a position-dependent prediction combination (PDPC) mode to decode the block of video data based at least on the determined intra prediction mode and a value of the syntax element associated with the primary transform or the secondary transform used for the block of video data, wherein to determine whether or not to use the PDPC mode, wherein the one or more processors are further configured to:
determine to use the PDPC mode to decode the block of video data in the case that the intra prediction mode is a planar mode irrespective of a value of the syntax element associated with the primary transform or the secondary transform used for the block of video data.

10. The apparatus of claim 9, wherein to determine whether or not to use the PDPC, the one or more processors are further configured to:
determine to use the PDPC mode to decode the block of video data in the case that the intra prediction mode is a planar mode.

11. The apparatus of claim 9, wherein the primary transform is one of a discrete cosine transform (DCT), discrete sine transform (DST), or enhanced multiple transform (EMT).

12. The apparatus of claim 9, wherein the secondary transform is one of a rotational transform or a non-separable secondary transform (NSST).

13. The apparatus of claim 9, wherein the syntax element is an index to the primary transform or the secondary transform.

14. The apparatus of claim 9, wherein the syntax element is an index to a set of transforms.

15. The method of claim 9, wherein the one or more processors are further configured to:
decode the block of video data using the determined intra prediction mode and the PDPC mode in the case that it is determined to use the PDPC mode; or
decode the block of video data using the determined intra prediction mode and not the PDPC mode in the case that it is not determined to use the PDPC mode.

16. The apparatus of claim 15, wherein the one or more processors are further configured to:
output the decoded block of video data.

17. An apparatus configured to decode video data, the apparatus comprising:
means for receiving a block of video data;
means for receiving a syntax element associated with a primary transform or a secondary transform used for the block of video data;
means for determining an intra prediction mode for the block of video data; and
means for determining whether or not to use a position-dependent prediction combination (PDPC) mode to decode the block of video data based at least on the determined intra prediction mode and a value of the syntax element associated with the primary transform or the secondary transform used for the block of video data, wherein the means for determining whether or not to use the PDPC mode comprises:
means for determining to use the PDPC mode to decode the block of video data in the case that the intra prediction mode is a planar mode irrespective of a value of the syntax element associated with the primary transform or the secondary transform used for the block of video data.

18. A non-transitory computer-readable storage medium storing instructions that, when executed, causes one or more processors of a device configured to decode video data to:
receive the block of video data;
receive a syntax element associated with a primary transform or a secondary transform used for the block of video data;
determine an intra prediction mode for the block of video data; and
determine whether or not to use a position-dependent prediction combination (PDPC) mode to decode the block of video data based at least on the determined intra prediction mode and a value of the syntax element associated with the primary transform or the secondary transform used for the block of video data, wherein to determine whether or not to use the PDPC mode, wherein the instructions further cause the one or more processors to:

determine to use the PDPC mode to decode the block of video data in the case that the intra prediction mode is a planar mode irrespective of a value of the syntax element associated with the primary transform or the secondary transform used for the block of video data.

19. A method of encoding video data, the method comprising:

receiving a block of video data;

determining a primary transform or a secondary transform used for the block of video data;

determining an intra prediction mode for encoding the block of video data; and determining whether or not to use a position-dependent prediction combination (PDPC) mode to encode the block of video data based at least on the determined intra prediction mode and the primary transform or the secondary transform used for the block of video data, wherein determining whether or not to use the PDPC mode comprises:

determining to use the PDPC mode to decode the block of video data in the case that the intra prediction mode is a planar mode irrespective of the primary transform or the secondary transform used for the block of video data.

20. An apparatus configured to encode video data, the apparatus comprising:

a memory configured to store a block of video data; and one or more processors in communication with the memory, the one or more processors configured to:

receive the block of video data;

determine a primary transform or a secondary transform used for the block of video data;

determine an intra prediction mode for encoding the block of video data; and determine whether or not to use a position-dependent prediction combination (PDPC) mode to encode the block of video data based at least on the determined intra prediction mode and the primary transform or the secondary transform used for the block of video data, wherein to determine whether or not to use the PDPC mode, wherein the one or more processors are further configured to:

determine to use the PDPC mode to decode the block of video data in the case that the intra prediction mode is a planar mode irrespective of the primary transform or the secondary transform used for the block of video data.

* * * * *